(12) United States Patent
Patenaude et al.

(10) Patent No.: US 11,721,234 B2
(45) Date of Patent: Aug. 8, 2023

(54) METHODS AND SYSTEMS TO AUTONOMOUSLY TRAIN DRIVERS

(71) Applicant: GM GLOBAL TECHNOLOGY OPERATIONS LLC, Detroit, MI (US)

(72) Inventors: Russell A. Patenaude, Macomb Township, MI (US); Ryan M. Edwards, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 17/070,366

(22) Filed: Oct. 14, 2020

(65) Prior Publication Data

US 2022/0114909 A1    Apr. 14, 2022

(51) Int. Cl.
*G09B 9/00* (2006.01)
*G09B 9/052* (2006.01)
(Continued)

(52) U.S. Cl.
CPC ........... *G09B 9/052* (2013.01); *B60W 50/087* (2013.01); *B60W 50/12* (2013.01); *G09B 9/042* (2013.01); *B60W 2540/10* (2013.01); *B60W 2540/12* (2013.01); *B60W 2540/18* (2013.01); *B60W 2540/30* (2013.01)

(58) Field of Classification Search
CPC .... B60W 50/087; B60W 50/12; B60W 50/08; B60W 50/14; B60W 50/00; G09B 9/052
See application file for complete search history.

(56) References Cited

U.S. PATENT DOCUMENTS 9,424,696 B2 *  8/2016  McQuade .............. G09B 9/052
10,407,078 B2 *  9/2019  Ratnasingam ......... G06Q 40/08
(Continued)

FOREIGN PATENT DOCUMENTS

CN        105654808 A  †  6/2016
WO      2014042571 A1  †  3/2014
WO      2018140022 A1  †  8/2018

OTHER PUBLICATIONS

Rimac Driver Coach; Autonomes Fahrertraining bei Tempo 300; auto motor und sport; Aug. 2, 2022.†

(Continued)

*Primary Examiner* — Jacob M Amick
*Assistant Examiner* — Sherman D Manley
(74) *Attorney, Agent, or Firm* — Lorenz & Kopf LLP

(57) ABSTRACT

In accordance with an exemplary embodiment, a method is provided for training a trainee using an autonomous vehicle, the method including: measuring, via one or more sensors, one or more manual inputs from the trainee with respect to controlling the autonomous vehicle; determining, via a processor using an autonomous driving algorithm stored in a memory of the autonomous vehicle, one or more recommended actions for the autonomous vehicle; comparing, via the processor, the one or more manual inputs from the trainee with the one or more recommended actions for the autonomous vehicle, generating a comparison; and determining, via the processor, a score for the trainee based on the comparison between the one or more manual inputs from the trainee with the one or more recommended actions for the autonomous vehicle.

17 Claims, 5 Drawing Sheets

(51) Int. Cl.
*G09B 9/042* (2006.01)
*B60W 50/12* (2012.01)
*B60W 50/08* (2020.01)

(56) References Cited

U.S. PATENT DOCUMENTS

| | | | |
|---|---|---|---|
| 10,442,443 B1* | 10/2019 | Li | B60W 50/16 |
| 10,960,859 B2* | 3/2021 | Takeuchi | G06F 3/015 |
| 11,214,280 B2* | 1/2022 | Myers | B60W 50/14 |
| 2017/0166222 A1† | 6/2017 | James | |
| 2018/0018895 A1† | 1/2018 | Chan | |
| 2018/0118219 A1* | 5/2018 | Hiei | B60W 40/09 |
| 2018/0164808 A1* | 6/2018 | Prokhorov | B60W 50/085 |
| 2018/0281812 A1* | 10/2018 | Tochioka | B60W 40/09 |
| 2019/0077413 A1* | 3/2019 | Kondo | G08G 1/0112 |

OTHER PUBLICATIONS

KIT—Das KIT—Medien—Presseinformationen—PI 2017—Virtueller Fahrlehrer und realitätsnaher Fa; Sep. 5, 2017.†
Duan et al.; an Intelligent Driver Training System Based on Real Cars; Feb. 2, 2019.†
YellRobot.com; Artificial Intelligence Teaching Students How to Drive; Mar. 20, 2019.†

\* cited by examiner
† cited by third party

METHODS AND SYSTEMS TO AUTONOMOUSLY TRAIN DRIVERS

TECHNICAL FIELD

The present disclosure generally relates to vehicles, and more particularly relates to systems and methods for training drivers using autonomous vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable to train humans to be able to drive vehicle without autonomous assistance for the vehicle. For example, in various embodiments, a human may wish to drive for personal satisfaction, and/or may need to drive in certain situations, for example, if the human may be in a situation at some point in the future in which an operational autonomous vehicle may not be available or permitted in a certain location or situation.

Current techniques for training humans for driving include a human instructor. However, in certain situations, typical techniques using a human instructor may not always be optimal, for example as this may introduce biases of the human instructor, and/or may be more time consuming, costly, and/or difficult to schedule, and/or may include risks and/or inefficiencies, in certain situations.

Accordingly, it is desirable to provide systems and methods for training of human drivers of vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided for training a trainee using an autonomous vehicle, the method including: measuring, via one or more sensors, one or more manual inputs from the trainee with respect to controlling the autonomous vehicle; determining, via a processor using an autonomous driving algorithm stored in a memory of the autonomous vehicle, one or more recommended actions for the autonomous vehicle; comparing, via the processor, the one or more manual inputs from the trainee with the one or more recommended actions for the autonomous vehicle, generating a comparison; and determining, via the processor, a score for the trainee based on the comparison between the one or more manual inputs from the trainee with the one or more recommended actions for the autonomous vehicle.

Also in an exemplary embodiment, the step of measuring manual inputs includes measuring, via one or more sensors, one or more manual inputs from the trainee in engaging an accelerator pedal for the autonomous vehicle; the step of comparing the manual inputs with the recommended actions includes comparing, via the processor, the one or more manual inputs from the trainee in engaging the accelerator pedal with the one or more recommended actions for the autonomous vehicle, generating the comparison; and the step of determining the score includes determining, via the processor, the score for the trainee based on the comparison between the one or more manual inputs from the trainee in engaging the accelerator pedal with the one or more recommended actions for the autonomous vehicle.

Also in an exemplary embodiment, the step of measuring manual inputs includes measuring, via one or more sensors, one or more manual inputs from the trainee in engaging a steering wheel for the autonomous vehicle; the step of comparing the manual inputs with the recommended actions includes comparing, via the processor, the one or more manual inputs from the trainee in engaging the steering wheel with the one or more recommended actions for the autonomous vehicle, generating the comparison; and the step of determining the score includes determining, via the processor, the score for the trainee based on the comparison between the one or more manual inputs from the trainee in engaging the steering wheel with the one or more recommended actions for the autonomous vehicle.

Also in an exemplary embodiment, the step of measuring manual inputs includes measuring, via one or more sensors, one or more manual inputs from the trainee in engaging a brake pedal for the autonomous vehicle; the step of comparing the manual inputs with the recommended actions includes comparing, via the processor, the one or more manual inputs from the trainee in engaging the brake pedal with the one or more recommended actions for the autonomous vehicle, generating the comparison; and the step of determining the score includes determining, via the processor, the score for the trainee based on the comparison between the one or more manual inputs from the trainee in engaging the brake pedal with the one or more recommended actions for the autonomous vehicle.

Also in an exemplary embodiment, the method further includes providing instantaneous feedback for the trainee based on the comparison between the one or more manual inputs from the trainee with the one or more recommended actions for the autonomous vehicle.

Also in an exemplary embodiment, the method further includes providing results associated with the score for the trainee to one or more third parties.

Also in an exemplary embodiment, the method further includes: determining whether the score for the trainee exceeds one or more predetermined thresholds; and selectively allowing the trainee to control one or more features of driving functionality for the autonomous vehicle.

Also in an exemplary embodiment, the step of selectively allowing the trainee to control one or more features of the vehicle includes: selectively allowing the trainee to control certain features of driving functionality for the autonomous vehicle, based on whether the score exceeds one or more first thresholds; and automatically controlling certain other features of driving functionality, via instructions provided by the processor in accordance with the autonomous driving algorithm, based on whether the score exceeds one or more second thresholds that are different from the first thresholds.

In another exemplary embodiment, A system for training a trainee using an autonomous vehicle, the system including: one or more sensors configured to measure manual inputs from the trainee with respect to controlling the autonomous vehicle; a non-transitory computer readable memory configured to store an autonomous driving algorithm for the autonomous vehicle; and a processor coupled to the one or more sensors and to the non-transitory computer readable memory and configured to at least facilitate: determining, using the autonomous driving algorithm, one or more recommended actions for the autonomous vehicle; comparing the one or more manual inputs from the trainee with the one or more recommended actions for the autonomous vehicle, generating a comparison; and determining a score for the trainee based on the comparison between the one or more manual inputs from the trainee with the one or more recommended actions for the autonomous vehicle.

Also in an exemplary embodiment, the one or more sensors are configured to measure the one or more manual inputs from the trainee in engaging an accelerator pedal for the autonomous vehicle; and the processor is configured to at least facilitate: comparing the one or more manual inputs from the trainee in engaging the accelerator pedal with the one or more recommended actions for the autonomous vehicle, generating the comparison; and determining the score for the trainee based on the comparison between the one or more manual inputs from the trainee in engaging the accelerator pedal with the one or more recommended actions for the autonomous vehicle.

Also in an exemplary embodiment, the one or more sensors are configured to measure the one or more manual inputs from the trainee in engaging a steering wheel for the autonomous vehicle; and the processor is configured to at least facilitate: comparing the one or more manual inputs from the trainee in engaging the steering wheel with the one or more recommended actions for the autonomous vehicle, generating the comparison; and determining the score for the trainee based on the comparison between the one or more manual inputs from the trainee in engaging the steering wheel with the one or more recommended actions for the autonomous vehicle.

Also in an exemplary embodiment, the one or more sensors are configured to measure the one or more manual inputs from the trainee in engaging a brake pedal for the autonomous vehicle; and the processor is configured to at least facilitate: comparing the one or more manual inputs from the trainee in engaging the brake pedal with the one or more recommended actions for the autonomous vehicle, generating the comparison; and determining the score for the trainee based on the comparison between the one or more manual inputs from the trainee in engaging the brake pedal with the one or more recommended actions for the autonomous vehicle.

Also in an exemplary embodiment, the processor is further configured to at least facilitate providing instantaneous feedback for the trainee based on the comparison between the one or more manual inputs from the trainee with the one or more recommended actions for the autonomous vehicle.

Also in an exemplary embodiment, the processor is further configured to at least facilitate providing results associated with the score for the trainee to one or more third parties.

Also in an exemplary embodiment, the processor is further configured to at least facilitate: determining whether the score for the trainee exceeds one or more predetermined thresholds; and selectively allowing the trainee to control one or more features of driving functionality for the autonomous vehicle.

Also in an exemplary embodiment, the processor is further configured to at least facilitate: selectively allowing the trainee to control certain features of driving functionality for the autonomous vehicle, based on whether the score exceeds one or more first thresholds; and automatically controlling certain other features of driving functionality, via instructions provided by the processor in accordance with the autonomous driving algorithm, based on whether the score exceeds one or more second thresholds that are different from the first thresholds.

In another exemplary embodiment, an autonomous vehicle for training a trainee is provided that includes: an accelerator pedal; a brake pedal; a steering wheel; a plurality of sensors configured to measure manual inputs from the trainee with respect to controlling the autonomous vehicle via the trainee's engagement of the accelerator pedal, brake pedal, and steering wheel; a non-transitory computer readable memory configured to store an autonomous driving algorithm for the autonomous vehicle; and a processor coupled to the one or more sensors and to the non-transitory computer readable memory and configured to at least facilitate: determining, using the autonomous driving algorithm, one or more recommended actions for the autonomous vehicle; comparing the one or more manual inputs from the trainee with the one or more recommended actions for the autonomous vehicle, generating a comparison; and determining a score for the trainee based on the comparison between the one or more manual inputs from the trainee with the one or more recommended actions for the autonomous vehicle.

Also in an exemplary embodiment, the processor is further configured to at least facilitate: providing instantaneous feedback for the trainee based on the comparison between the one or more manual inputs from the trainee with the one or more recommended actions for the autonomous vehicle; and providing results associated with the score for the trainee to one or more third parties.

Also in an exemplary embodiment, the processor is further configured to at least facilitate: determining whether the score for the trainee exceeds one or more predetermined thresholds; and selectively allowing the trainee to control one or more features of driving functionality for the autonomous vehicle.

Also in an exemplary embodiment, the processor is further configured to at least facilitate: selectively allowing the trainee to control certain features of driving functionality for the autonomous vehicle, based on whether the score exceeds one or more first thresholds; and automatically controlling certain other features of driving functionality, via instructions provided by the processor in accordance with the autonomous driving algorithm, based on whether the score exceeds one or more second thresholds that are different from the first thresholds.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
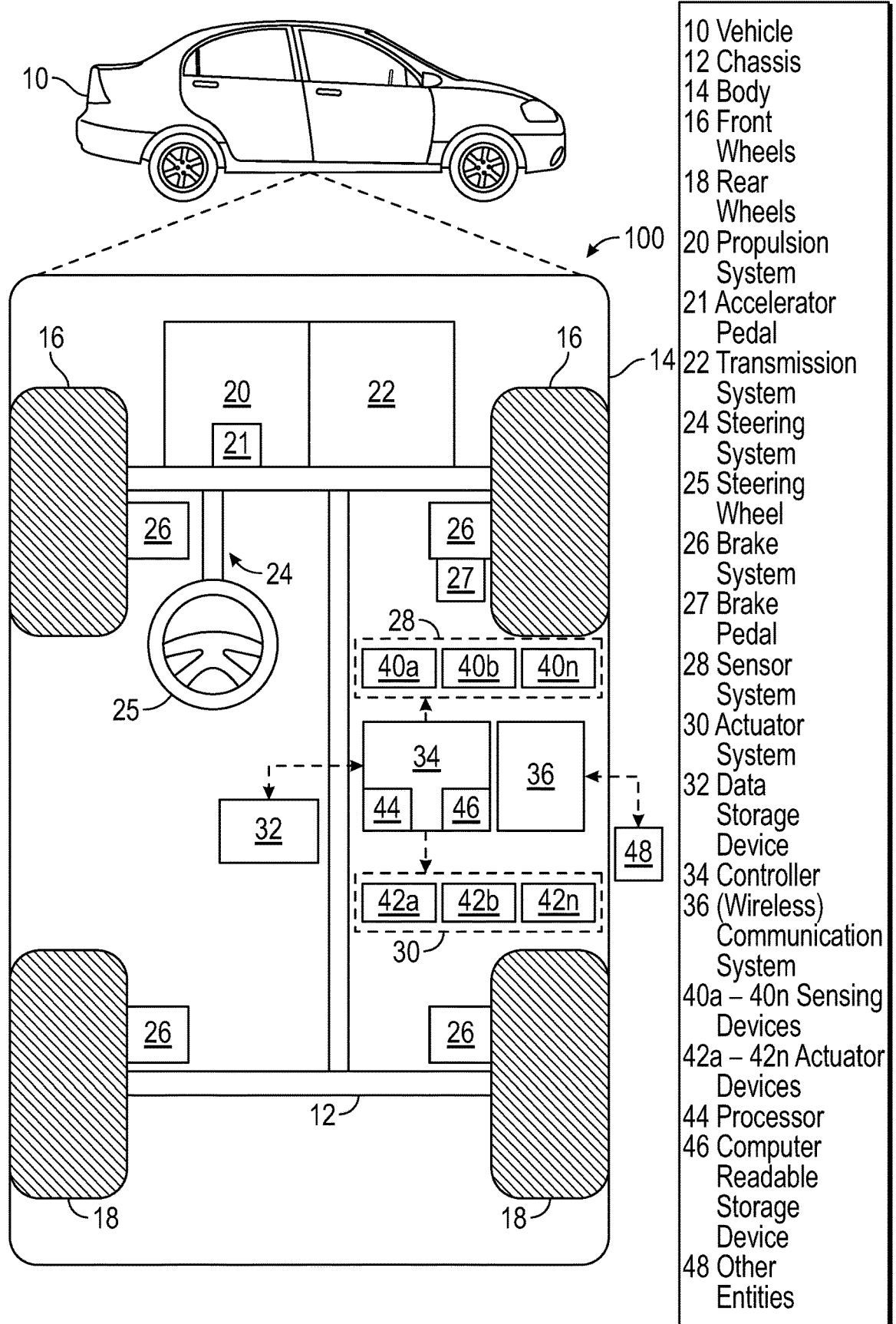
FIG. 1 is a functional block diagram illustrating an autonomous vehicle, in accordance with various embodiments.

With reference to FIG. 1, a driver training control system 100 shown generally as 100 is associated with a vehicle 10 in accordance with various embodiments. In general, the driver training control system (or simply "system") 100 provides training of humans for driving, using the vehicle 10. In various embodiments, the vehicle 10 comprises an autonomous vehicle.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. While an automotive vehicle is depicted in FIG. 1, it will be appreciated that in various embodiments the vehicle 10 may comprise any number of other types of vehicles (such as, by way of example, boats, other marine vehicles, trains, aircraft, and/or spacecraft) and/or one or more other types of mobile platforms.

In various embodiments, the vehicle 10 is an autonomous vehicle and the driver training control system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used. As described in further greater further below, the vehicle 10 is also configured to train humans how to drive a vehicle, for example so that the human is able, once trained, to drive a vehicle without relying on the autonomous vehicle functionality.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36.

The propulsion system 20 may, in various embodiments, include an internal combustion engine, an electric machine such as a traction motor, and/or a fuel cell propulsion system. In various embodiments, the propulsion system 20 has or is coupled to an accelerator pedal 21 for a driver (and/or trainee) to provide manual acceleration inputs for the propulsion system 20 for proving acceleration for the vehicle 10.

The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. In various embodiments, the brake system 26 includes a brake pedal 27 for a driver (and/or trainee) to provide manual braking inputs for the brake system 26.

The steering system 24 influences a position of the vehicle wheels 16 and/or 18. In various embodiments, the steering system 24 includes a steering wheel 25 for a driver (and/or trainee) to provide manual steering inputs for the steering system 24.

The sensor system 28 includes one or more sensing devices 40a-40n that sense observable conditions of the exterior environment and/or the interior environment of the autonomous vehicle 10. The sensing devices 40a-40n might include, but are not limited to, brake pedal sensors, steering wheel sensors, accelerator pedal sensors, radars, lidars, global positioning systems, optical cameras, thermal cameras, ultrasonic sensors, turn signals and sensors therefor, cameras and/or other sensors for watching drivers (e.g., for correct mirror use, and so on) and/or other sensors. The actuator system 30 includes one or more actuator devices 42a-42n that control one or more vehicle features of the vehicle 10. In various embodiments, the actuator devices 42a-42n (also referred to as the actuators 42) control one or more features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as a trunk, and cabin features such as air, music, lighting, touchscreen display components (such as those used in connection with navigation systems), and the like.

The data storage device 32 stores data for use in automatically controlling the autonomous vehicle 10 and for conducting driver training using the autonomous vehicle 10. In various embodiments, the data storage device 32 stores information pertaining to scoring of a current driver's (or trainee's) driving, including based on comparisons between the driver's (or trainee's) manual driving inputs as compared with the driving inputs recommended by the autonomous functionality of the vehicle 10.

In addition, in various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores data pertaining to roadways on which the vehicle 10 may be travelling. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10 and in providing driver training.

In various embodiments, the processor 44 provides driver training for a human driver based on scoring of a current driver's (or trainee's) driving, including based on comparisons between the driver's (or trainee's) manual driving inputs as compared with the driving inputs recommended by the autonomous functionality of the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for the driver training as well as for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, the controller 34 is configured for use in providing driver training using the autonomous vehicle 10.

Figure 2:
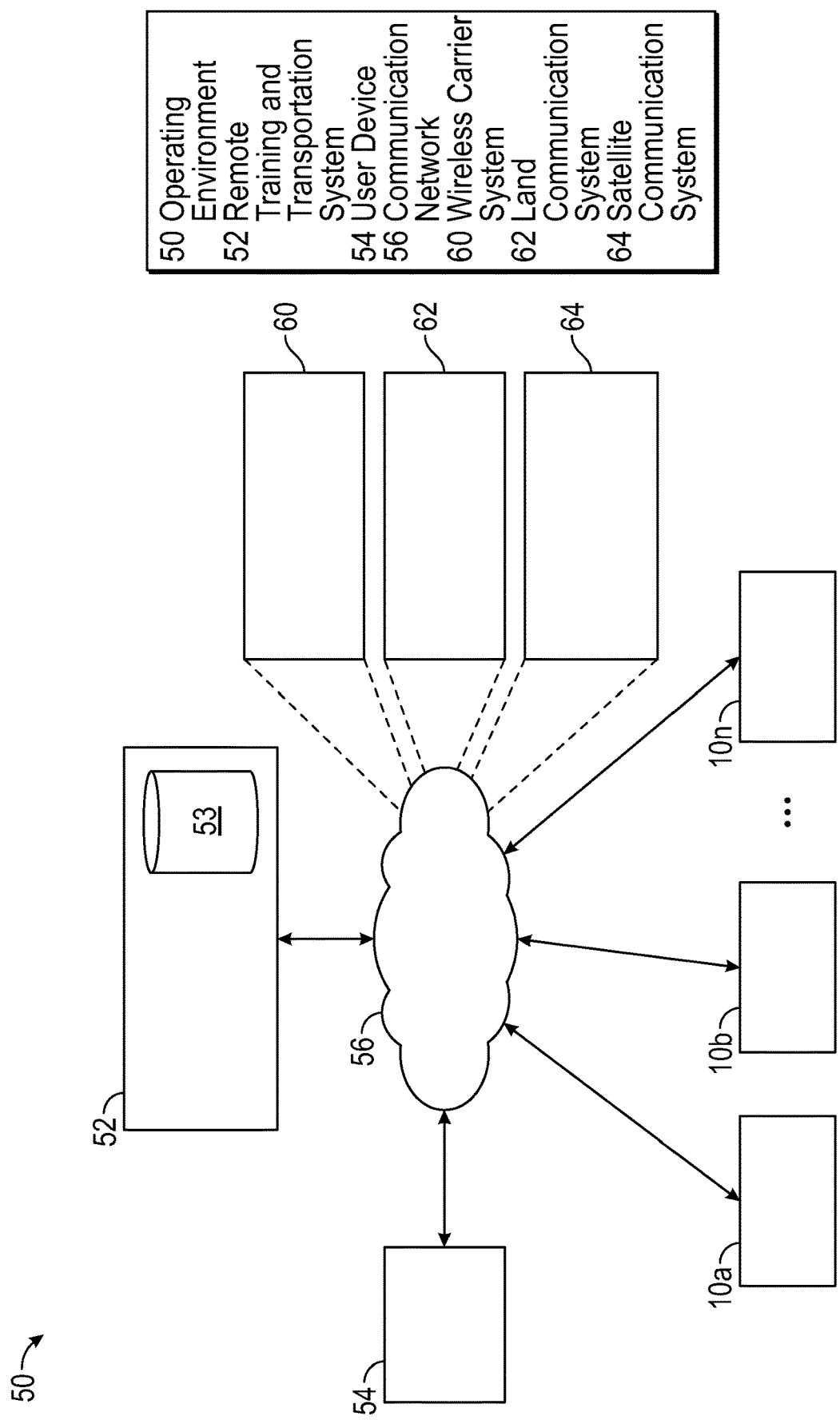
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), training and transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a group or fleet of vehicles or may simply be managed by a remote system. For example, the autonomous vehicle 10 may be associated with a group or fleet of autonomous vehicles for training student drivers (and, in certain embodiments, also for transportation). FIG. 2 illustrates an exemplary embodiment of an operating environment shown generally at 50 that includes an autonomous vehicle based remote system (or simply "training and transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the training and transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the training and transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the training and transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The training and transportation system 52 includes one or more backend server systems, not shown), which may be cloud-based, network-based, or resident at the particular campus or geographical location serviced by the training and transportation system 52. The training and transportation system 52 can be manned by a live advisor, an automated advisor, an artificial intelligence system, or a combination thereof. The training and transportation system 52 can communicate with the user devices 54 and the autonomous vehicles 10a-10n to provide driver training as well as schedule rides, dispatch autonomous vehicles 10a-10n, and the like. In various embodiments, the training and transportation system 52 stores store account information such as subscriber authentication information, vehicle identifiers, profile records, biometric data, behavioral patterns, and other pertinent subscriber information.

In accordance with a typical use case workflow, a registered user of the training and transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The training and transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based training and transportation system 52. To this end, an autonomous vehicle and autonomous vehicle based training and transportation system can be modified, enhanced, or otherwise supplemented to provide the additional features described in more detail below.

Figure 3:
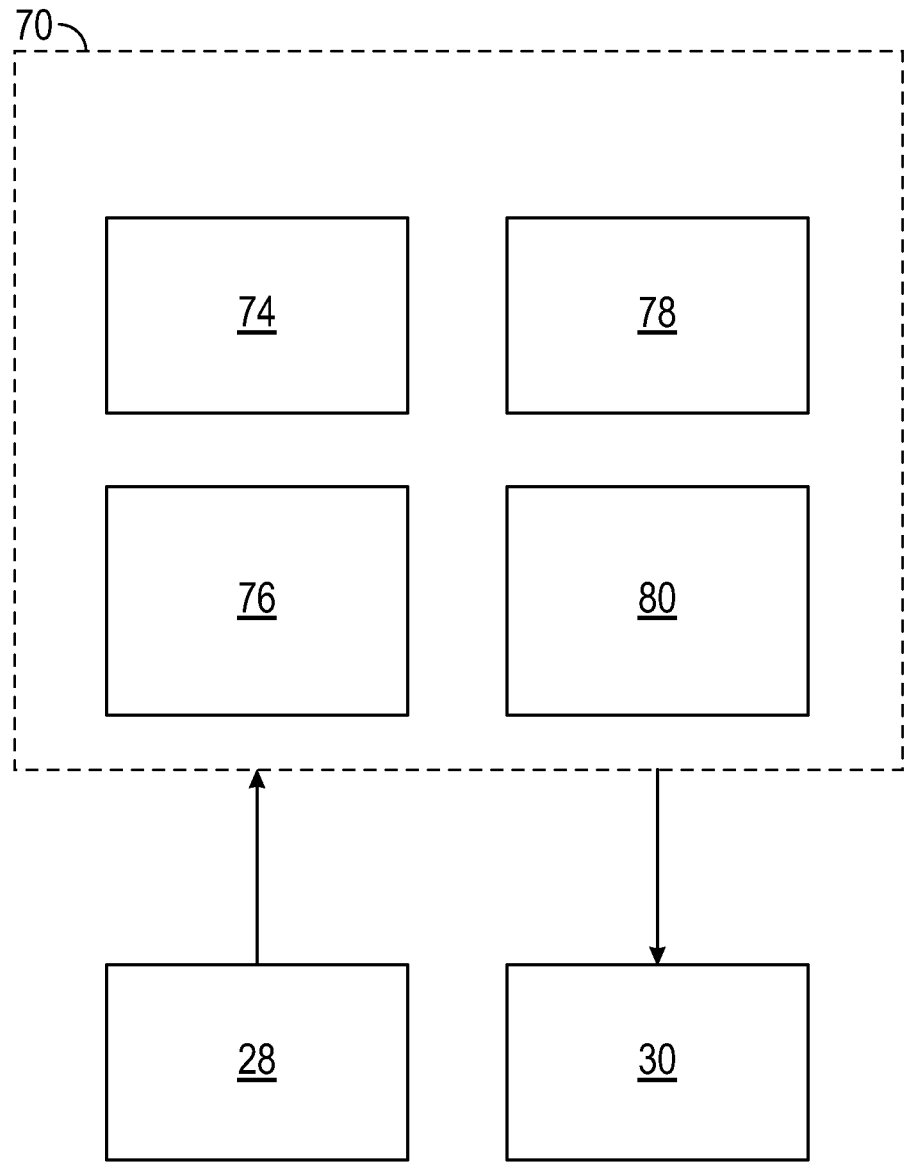
FIG. 3 is functional block diagram illustrating an autonomous driving system (ADS) associated with an autonomous vehicle, in accordance with various embodiments.

In accordance with various embodiments, controller 34 implements an autonomous driving system (ADS) as shown in FIG. 3. That is, suitable software and/or hardware components of controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

With reference back to FIG. 1, in various embodiments, one or more instructions of the controller 34 are embodied in the user driver training control system 100 of FIG. 1, which controls driver training via the autonomous vehicle 10.

Figure 4:
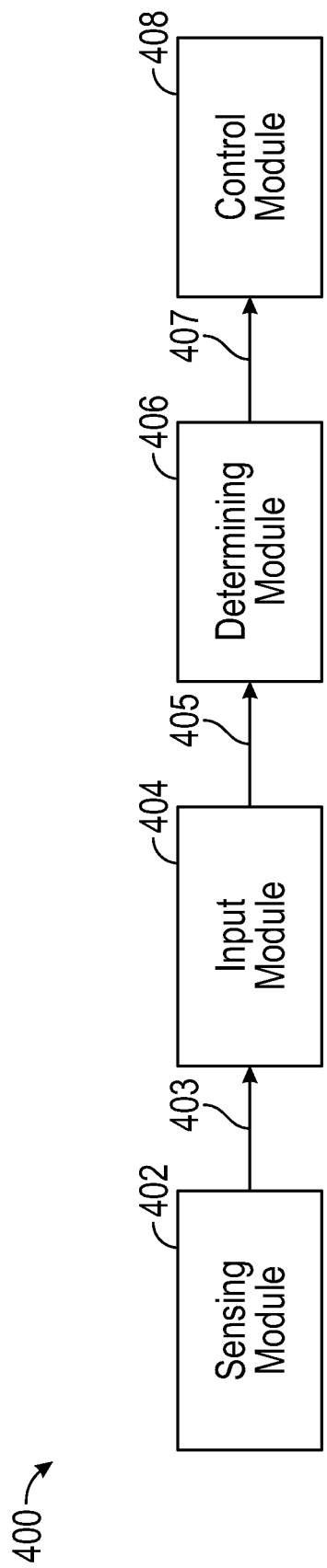
FIG. 4 is a dataflow diagram illustrating a driver training control system for autonomous vehicles, in accordance with various embodiments.

Referring to FIG. 4, an exemplary driver training control system 400 generally includes a sensing module 402, an input module 404, a determining module 406, and a control module 408.

In various embodiments, the sensing module 402 obtains sensor data for the vehicle 10 and its surroundings, including as to a location of the vehicle 10, operating parameters for the vehicle 10 (e.g., heading, velocity, acceleration, steering angle, and so on), and an environment surrounding the vehicle 10 (e.g., roadways, other vehicles, and other objects in proximity to the vehicle 10, weather, traffic conditions, road conditions, and so on). In various embodiments, the sensor data is obtained vi the sensing devices (e.g., sensors) 40 of the sensor system of FIG. 1. In various embodiments, the sensing module 402 provides the sensor data as inputs 403 for the input module 404 and/or determining module 406, described below.

Also in various embodiments, the input module 404 receives manual inputs from a driver trainee for the vehicle 10. For example, in various embodiments, the input module receives manual inputs from the trainee's engagement of vehicle input devices such as the accelerator pedal 21, steering wheel 25, and brake pedal 27 of FIG. 1, via sensors 40 of FIG. 1 that are coupled to such input devices (e.g., that are coupled to the accelerator pedal 21, steering wheel 25, brake pedal 27, and so on). In various embodiments, the driver manual inputs comprise a driver's intended operation of the vehicle 10 (e.g., for propulsion, steering, braking, and so on), and are provided as inputs 405 for the determining module 406, described below.

Also in various embodiments, the determining module 406 determines recommended actions for the vehicle 10 based on the sensor inputs 403 provided by the sensing module 402, using autonomous control functionality and associated algorithms of the autonomous vehicle 10. In addition, also in various embodiments, the determining module 406 also compares the user manual inputs 405 with the recommended actions of the vehicle 10, and determines scoring for the trainee based on this comparison. In various embodiments, the scoring is provided as inputs 407 for the control module 407.

In addition, in various embodiments, the control module 408 reports the scoring for the trainee and/or one or back offices and/or authorities (e.g., an operator of a fleet of vehicles, a motor vehicle driving authority, and so on) based on the scoring inputs 407. Also in various embodiments, the control module 408 controls vehicle operations (e.g., including propulsion, steering, and braking) generally in accordance with the sensor inputs 403. Furthermore, in various embodiments, the control module 408 allows gradual control of the of the trainee over driving of the vehicle 10 (e.g., in certain embodiments, gradual access to various levels and/or control over operation of the vehicle 10), based on the scoring for the trainee as reflected in the scoring inputs 407.

Figure 5:
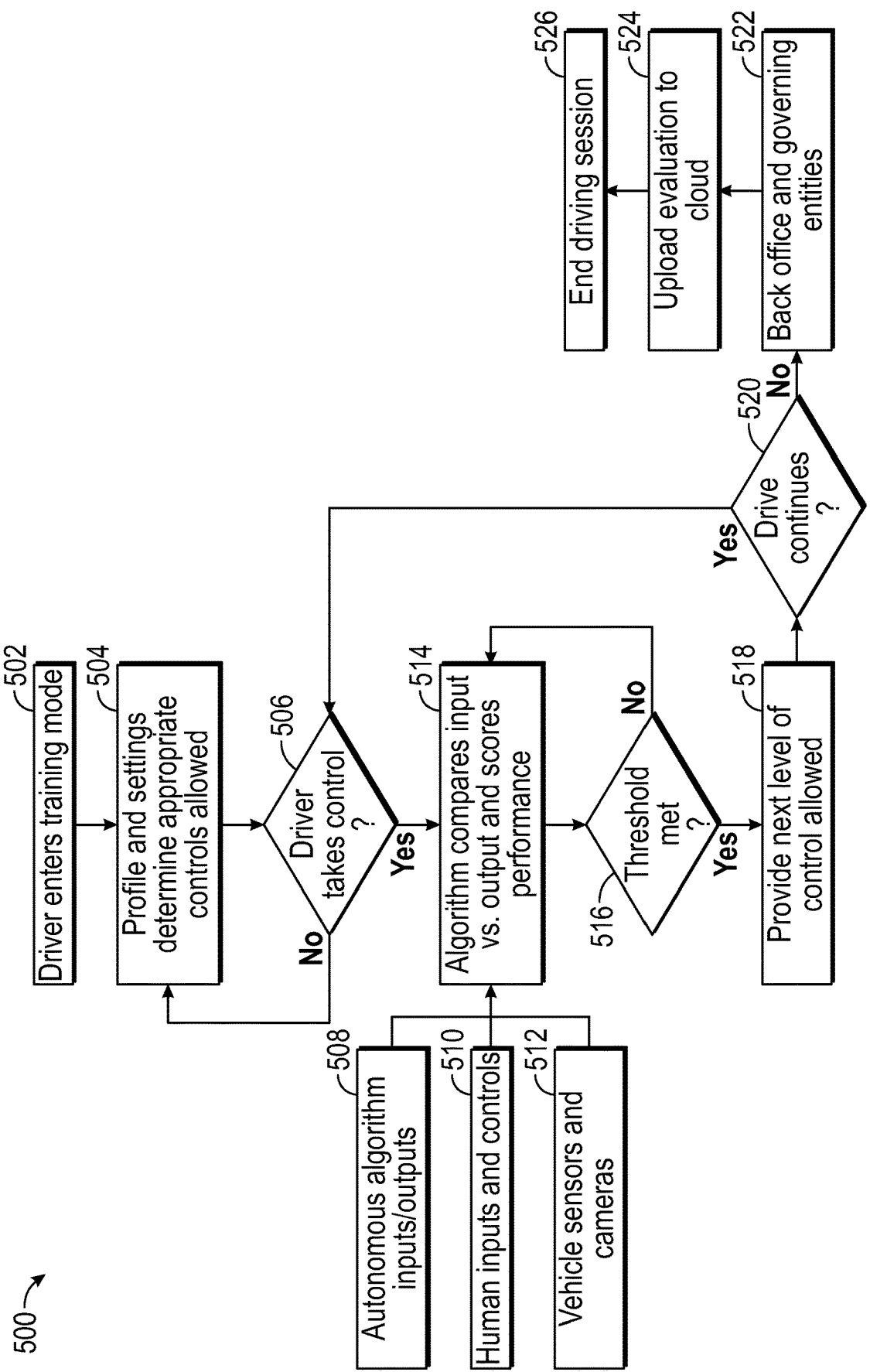
FIG. 5 is a flowchart for a control process for training drivers using autonomous vehicles, in accordance with various embodiments.

In various embodiments, the sensing module 402, input module 404, determining module 406, and control module 408 of FIG. 4, along with associated components of the vehicle 10 of FIG. 1 (e.g., the sensors 40, processor 44, and computer readable storage device) provide these functions in accordance with the process 500 that is depicted in FIG. 5 and described below in connection therewith.

FIG. 5 is a flowchart for a control process 500 for training drivers using autonomous vehicles, in accordance with an exemplary embodiment. The control method 400 is discussed below in connection with FIG. 5 as well as continued reference to FIGS. 1-4. In various embodiments, the control method 500 can be performed by the system 100, the autonomous vehicle 10, the driving training control system 400, and the various components and associated implementations of FIGS. 1-4, in accordance with exemplary embodiments. As can be appreciated in light of the disclosure, the order of operation within the method is not limited to the sequential execution as illustrated in FIG. 5, but may be performed in one or more varying orders as applicable and in accordance with the present disclosure. In various embodiments, the control method 500 can be scheduled to run based on one or more predetermined events, and/or can run continuously during operation of the autonomous vehicle 10.

In various embodiments, the control method 500 may begin at step 502. In various embodiments, 602 occurs when an occupant/trainee is within the vehicle 10 and enters a training mode for the vehicle 10.

In various embodiments, profile and settings are determined for the trainee at step 504. Specifically, in various embodiments, the trainee is identified (e.g., via a keyfob and/or other characteristic of the trainee, and/or a manual inputting of the trainee's name and/or other identification, and so on). Also in various embodiments, appropriate controls for the trainee are established based on the trainee's prior experience and/or scoring with respect to the vehicle 10. For example, in certain embodiments, the trainee may be gradually be allowed to use different functionality of the vehicle 10 for driving and operation of the vehicle 10 after the trainee has met specific testing and/or scoring metrics with respect to such functionality, and so on. In various embodiments, these determinations are made via the processor 44 of FIG. 1 using sensor inputs from the sensors 40 of FIG. 1 and data stored regarding the trainee in the computer readable storage device (e.g., computer memory) 46 of FIG. 1.

Also in various embodiments, a determination is made at step 506 as to whether the trainee is attempting to take control of the vehicle 10. In various embodiments, this determination is made by the processor 44 of FIG. 1 via sensors 40 of FIG. 1, for example as to whether the trainee has engaged one or more input devices such as the accelerator pedal 21, steering wheel 25, and/or brake pedal 27 of FIG. 1.

If it is determined that the trainee is attempting to take control, then, in various embodiments, recommended vehicle actions are determined and compared with the user manual inputs in steps 508-514, described below.

Specifically, in various embodiments, an autonomous algorithm for the vehicle 10 utilizes various inputs (including sensor data as to the operating of the vehicle 10 and the surrounding environment for the vehicle) in step 508. In various embodiments, this is performed by the processor 44 of FIG. 1 based on data provided by the sensors 40 of FIG. 1 using autonomous driving algorithms stored in the memory 46 of FIG. 1.

In addition, in various embodiments, human manual inputs and control for the vehicle 10 are obtained in step 510. Specifically, in various embodiments, the trainee's intended actions for the vehicle are ascertained via the trainee's engagement of vehicle input devices such as the accelerator pedal 21, steering wheel 25, and brake pedal 27 of the vehicle 10, as measured via sensors 40 of FIG. 1 that are coupled thereto.

Also in various embodiments, data from other vehicle sensors is obtained at step 512. Specifically, in various embodiments, data from other vehicle sensors 40, for example, such as cameras, radar, Lidar, sonar, and the like, are obtained and further utilized for determining vehicle action in accordance with the autonomous algorithm and used for comparison with the user manual inputs for the trainee's intended actions for the vehicle 10. In various embodiments, the sensor data from the other vehicle sensors may include, among other sensor data, sensor data from other sensors, inputs, cameras, and the like that may not be part of the autonomous system, but that may be used for the driving scoring algorithm (e.g., inside cameras looking at the driver to see if he or she is paying attention and looking both ways while driving, and so on).

In addition, also in various embodiments, an algorithm is utilized at step 514 to compare user manual inputs with the outputs of the autonomous driving algorithm. For example, in various embodiments, the trainee's requested vehicle actions (for example, for requested acceleration, steering, and braking of the vehicle, as determined by the trainee's engagement of the accelerator pedal 21, steering wheel 25, and brake pedal 27, respectively, of the vehicle 10) are compared with recommended vehicle actions as determined by the autonomous driving algorithm (for example, as to recommended acceleration, steering, and braking of the vehicle 10).

In various embodiments, the processor 44 of FIG. 1 makes these determinations. In addition, in various embodiments, the processor 44 also calculates a score for the trainee based on these comparisons. In addition, in various embodiments, the processor 44 provides instructions for various notifications and/or warnings to the trainee and/or one or more other parties (e.g., to a back office, fleet operator, government driving authority, and so on) as to the scoring, as well as to specific instructions for improvement for the trainee. For example, in various embodiments, when the trainee engages a particular user device (e.g. accelerator pedal 21, steering wheel 25, or brake pedal 27) of the vehicle 10, the processor 44 provides immediate audible, visual, haptic, and/or other feedback for the trainee as to whether or not the trainee's intended action (e.g., acceleration, steering, or braking) is consistent with the recommended vehicle action as determined by the autonomous driving algorithm that is stored in the memory 46 of the computer system of the autonomous vehicle 10 and executed by the processor 44 thereof.

Also in various embodiments, one or more determinations are made at step 516 as to whether or not the trainee has earned control over specific features of vehicle functionality. Specifically, in various embodiments, the processor 44 of FIG. 1 determines whether the scoring of the trainee has exceeded one or more thresholds required for the trainee to be allowed to control one or more specific features of vehicle functionality (e.g., certain types of acceleration, steering, braking, and so on).

For example, in different embodiments, different levels of scoring are required for a trainee/driver to be allowed different specific types of features of vehicle functionality, under a phased or gradual approach. For example, in certain embodiments: (i) a first threshold is required for the trainee to control steering within a lane on a highway; (ii) a second threshold (higher, or more difficult to meet, as compared with the first threshold) is required for the trainee to provide acceleration for the vehicle 10; (iii) a third threshold (higher, or more difficult to meet, as compared with the second threshold) is required for the trainee to provide braking for the vehicle 10; and (iv) a fourth threshold (higher, or more difficult to meet, as compared with the third threshold) is required for the trainee to provide full control of the vehicle 10, and so on.

If it is determined at step 516 that the trainee's scoring has not met respective predetermined threshold values for particular features of driving functionality, then the processor 44 disallows the trainee's control over such features of driving functionality, and provides instructions for the control of such driving features to be provided via the autonomous driving algorithm, for example via instructions provided from the processor 44 of FIG. 1 to the actuators 42.

Conversely, if it is instead determined at step 516 that the trainee's scoring has met respective predetermined threshold values for particular features of driving functionality, then the processor 44 allows the trainee's control over such driving features, for example based on the trainee/driver's engagement of input devices such as the accelerator pedal 21, steering wheel 25, and brake pedal 27 of the vehicle 10.

As noted above, in various embodiments, a gradual or phased approach is utilizing for allowing control to the driver for different features of driving functionality. Accordingly, in certain embodiments, when the trainee has achieved scoring that is high enough to allow trainee control over some driving features but not others, it will be appreciated that in certain embodiments the processor 44 may simultaneously: (i) allow the trainee control over certain driving features in step 518 while also (ii) maintain autonomous control over certain other driving features in step 516.

In various embodiments, a determination is made in step 520 as to whether the vehicle drive continues. In various embodiments, during step 520, the processor 44 determines whether the trainee is still utilizing the vehicle 10 in a training mode.

In various embodiments, if it is determined in step 520 that the vehicle drive continues, then the process returns to step 506. In various embodiments, steps 506-520 thereafter repeat, in new iterations, until a determination is made in a subsequent iteration of step 520 that the vehicle drive is complete.

In various embodiments, once it is determined in an iteration of step 520 that the vehicle drive no longer continues (e.g. that the vehicle drive is complete), then the process instead proceeds to step 522. Specifically, in various embodiments, during step 522, the scoring results for the trainee are provided. In various embodiments, the scoring for the trainee is provided to the trainee (e.g., to the user device 54 of FIG. 1) as well as to a back office (e.g., for an operator of a fleet of vehicles) and to governing entities (e.g., that monitor driving examinations, issue drivers licenses, regulate driving, and so on).

Also in various embodiments, an evaluation of the trainee's scoring is also uploaded to the cloud in step 524. For example, in certain embodiments, the scoring for the trainee is stored in one or more central database for future use, for example for when the trainee subsequently enters the vehicle 10 and/or another vehicle 10 of a similar type, and so on.

In various embodiments, the process then terminates at step 526, as the driving session ends.

Accordingly, in various embodiments, an autonomous vehicle is utilized in training human trainees to be able to drive a vehicle. In various embodiments, manual inputs from the driver are compared with outputs from an autonomous driving algorithm in order to provide training, assessments, and scoring for the trainee. In addition, in various embodiment, real time feedback is provided for the trainee. Moreover, also in various embodiments, as different thresholds are met with respect to the trainee's scoring, different driving features for the vehicle are effectively unlocked, thereby gradually transferring driving control to the trainee/driver as the trainee/driver's scoring gradually exceeds various increasing thresholds. In addition, in various embodiments, the scoring results are provided to the trainee/driver as well as to one or more other interested entities such as, by way of example, the controller of fleet of vehicles and/or governmental authorities that are in charge of regulating driving, administering driving examinations, issuing drivers licenses, and so on. Finally, it is noted that the gradual approach of incrementally providing control to the driver is the reverse of what is typically performed today, for example in which autonomous vehicles may be moving away from manually controlled accelerator pedals, steering wheels, brake pedals, and so on.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for training a trainee using an autonomous vehicle, the method comprising:
    measuring, via one or more sensors, one or more manual inputs from the trainee with respect to controlling the autonomous vehicle with respect to engagement by the trainee of a brake pedal, an accelerator pedal, and a steering wheel of the autonomous vehicle;
    determining, via a processor using an autonomous driving algorithm stored in a memory of the autonomous vehicle, one or more recommended actions for the autonomous vehicle with respect to respective recommended control actions for braking, acceleration, and steering of the autonomous vehicle;
    comparing, via the processor, the one or more manual inputs from the trainee with respect to the engagement by the trainee of the brake pedal, the accelerator pedal, and steering wheel of the autonomous vehicle with the one or more recommended actions for the autonomous vehicle with respect to the respective recommended control actions for braking, acceleration, and steering of the autonomous vehicle, generating a comparison;
    determining, via the processor, a score for the trainee based on the comparison between the one or more manual inputs from the trainee with respect to the engagement by the trainee of each of the brake pedal, accelerator pedal, and steering wheel of the autonomous vehicle with the respective recommended control actions for the braking, acceleration, and steering of the autonomous vehicle; and
    selectively allowing, via the processor, the trainee to gradually control different features of the autonomous vehicle, including control of the steering wheel, the brake pedal, and the accelerator pedal, instead of automatic control of the steering wheel, the brake pedal, and the accelerator, respectively, by the processor, based on determining, separately, whether the score exceeds different respective thresholds for a gradual transfer of control from the processor to the trainee of each of the steering wheel, the brake pedal, and the accelerator pedal, respectively.

2. The method of claim 1, further comprising:
    providing instantaneous feedback for the trainee based on the comparison between the one or more manual inputs from the trainee with the one or more recommended actions for the autonomous vehicle.

3. The method of claim 1, further comprising:
    providing results associated with the score for the trainee to one or more third parties.

4. The method of claim 1, further comprising
    determining whether the score for the trainee exceeds one or more predetermined thresholds; and
    selectively allowing the trainee to control one or more features of driving functionality for the autonomous vehicle.

5. The method of claim 4, wherein the step of selectively allowing the trainee to control one or more features of the vehicle comprises:
selectively allowing the trainee to control certain features of driving functionality for the autonomous vehicle, based on whether the score exceeds one or more first thresholds; and
automatically controlling certain other features of driving functionality, via instructions provided by the processor in accordance with the autonomous driving algorithm, based on whether the score exceeds one or more second thresholds that are different from the first thresholds.

6. The method of claim 1, wherein the trainee is selectively allowed, via the processor, to gradually control different features of the autonomous vehicle as follows:
the trainee is allowed, via the processor, to control steering via the steering wheel while the autonomous vehicle within a lane on a highway, when and only when the score exceeds a first predetermined threshold;
the trainee is allowed, via the processor, to control acceleration of the autonomous vehicle via the accelerator pedal when and only when the score exceeds a second predetermined threshold that is greater than the first predetermined threshold;
the trainee is allowed, via the processor, to control braking of the autonomous vehicle via the brake pedal when and only when the score exceeds a third predetermined threshold that is greater than the second predetermined threshold; and
the trainee is allowed, via the processor, full control of the autonomous vehicle when and only when the score exceeds a fourth predetermined threshold that is greater than the third predetermined threshold.

7. A system for training a trainee using an autonomous vehicle, the system comprising:
one or more sensors configured to measure manual inputs from the trainee with respect to controlling the autonomous vehicle with respect to engagement by the trainee of a brake pedal, an accelerator pedal, and a steering wheel of the autonomous vehicle;
a non-transitory computer readable memory configured to store an autonomous driving algorithm for the autonomous vehicle; and
a processor coupled to the one or more sensors and to the non-transitory computer readable memory and configured to at least facilitate:
determining, using the autonomous driving algorithm, one or more recommended actions for the autonomous vehicle with respect to respective recommended control actions for braking, acceleration, and steering of the autonomous vehicle;
comparing the one or more manual inputs from the trainee with respect to engagement by the trainee of the brake pedal, the accelerator pedal, and steering wheel of the autonomous vehicle with the one or more recommended actions for the autonomous vehicle with respect to the respective recommended control actions for braking, acceleration, and steering of the autonomous vehicle, generating a comparison;
determining a score for the trainee based on the comparison between the one or more manual inputs from the trainee with respect to engagement by the trainee of the brake pedal, the accelerator pedal, and steering wheel of the autonomous vehicle with the respective recommended control actions for the braking, acceleration, and steering of the autonomous vehicle; and
selectively allowing the trainee to gradually control different features of the autonomous vehicle, including control of the steering wheel, the brake pedal, and the accelerator pedal, instead of automatic control of the steering wheel, the brake pedal, and the accelerator, respectively, by the processor, based on determining, separately, whether the score exceeds different respective thresholds for a gradual transfer of control from the processor to the trainee of each of the steering wheel, the brake pedal, and the accelerator pedal, respectively.

8. The system of claim 7, wherein the processor is further configured to at least facilitate providing instantaneous feedback for the trainee based on the comparison between the one or more manual inputs from the trainee with the one or more recommended actions for the autonomous vehicle.

9. The system of claim 7, wherein the processor is further configured to at least facilitate providing results associated with the score for the trainee to one or more third parties.

10. The system of claim 7, wherein the processor is further configured to at least facilitate:
determining whether the score for the trainee exceeds one or more predetermined thresholds; and
selectively allowing the trainee to control one or more features of driving functionality for the autonomous vehicle.

11. The system of claim 10, wherein the processor is further configured to at least facilitate:
selectively allowing the trainee to control certain features of driving functionality for the autonomous vehicle, based on whether the score exceeds one or more first thresholds; and
automatically controlling certain other features of driving functionality, via instructions provided by the processor in accordance with the autonomous driving algorithm, based on whether the score exceeds one or more second thresholds that are different from the first thresholds.

12. The system of claim 7, wherein the processor is further configured to at least facilitate:
allowing the trainee to control steering via the steering wheel while the autonomous vehicle within a lane on a highway, when and only when the score exceeds a first predetermined threshold;
allowing the trainee to control acceleration of the autonomous vehicle via the accelerator pedal when and only when the score exceeds a second predetermined threshold that is greater than the first predetermined threshold;
allowing the trainee to control braking of the autonomous vehicle via the brake pedal when and only when the score exceeds a third predetermined threshold that is greater than the second predetermined threshold; and
allowing the trainee full control of the autonomous vehicle when and only when the score exceeds a fourth predetermined threshold that is greater than the third predetermined threshold.

13. An autonomous vehicle for training a trainee, the autonomous vehicle comprising:
an accelerator pedal;
a brake pedal;
a steering wheel;
a plurality of sensors configured to measure manual inputs from the trainee with respect to controlling the autonomous vehicle via the trainee's engagement and control of the accelerator pedal, brake pedal, and steering wheel;

a non-transitory computer readable memory configured to store an autonomous driving algorithm for the autonomous vehicle; and a processor coupled to the one or more sensors and to the non-transitory computer readable memory and configured to at least facilitate:

determining, using the autonomous driving algorithm, one or more recommended actions for the autonomous vehicle with respect to recommended control actions for braking, acceleration, and steering of the autonomous vehicle;

comparing the one or more manual inputs from the trainee with respect to engagement by the trainee of the brake pedal, the accelerator pedal, and steering wheel of the autonomous vehicle with the one or more recommended actions for the autonomous vehicle with respect to the respective recommended control actions for braking, acceleration, and steering of the autonomous vehicle, generating a comparison;

determining a score for the trainee based on the comparison between the one or more manual inputs from the trainee with respect to engagement by the trainee of the brake pedal, the accelerator pedal, and steering wheel of the autonomous vehicle with the respective recommended control actions for the braking, acceleration, and steering of the autonomous vehicle; and selectively allowing the trainee to gradually control different features of the autonomous vehicle, including control of the steering wheel, the brake pedal, and the accelerator pedal, instead of automatic control of the steering wheel, the brake pedal, and the accelerator, respectively, by the processor, based on determining, separately, whether the score exceeds different respective thresholds for a gradual transfer of control from the processor to the trainee of each of the steering wheel, the brake pedal, and the accelerator pedal, respectively.

14. The autonomous vehicle of claim 13, wherein the processor is further configured to at least facilitate:

providing instantaneous feedback for the trainee based on the comparison between the one or more manual inputs from the trainee with the one or more recommended actions for the autonomous vehicle; and providing results associated with the score for the trainee to one or more third parties.

15. The autonomous vehicle of claim 13, wherein the processor is further configured to at least facilitate:

determining whether the score for the trainee exceeds one or more predetermined thresholds; and selectively allowing the trainee to control one or more features of driving functionality for the autonomous vehicle.

16. The autonomous vehicle of claim 15, wherein the processor is further configured to at least facilitate:

selectively allowing the trainee to control certain features of driving functionality for the autonomous vehicle, based on whether the score exceeds one or more first thresholds; and automatically controlling certain other features of driving functionality, via instructions provided by the processor in accordance with the autonomous driving algorithm, based on whether the score exceeds one or more second thresholds that are different from the first thresholds.

17. The autonomous vehicle of claim 13, wherein the processor is further configured to at least facilitate:

allowing the trainee to control steering via the steering wheel while the autonomous vehicle within a lane on a highway, when and only when the score exceeds a first predetermined threshold;

allowing the trainee to control acceleration of the autonomous vehicle via the accelerator pedal when and only when the score exceeds a second predetermined threshold that is greater than the first predetermined threshold;

allowing the trainee to control braking of the autonomous vehicle via the brake pedal when and only when the score exceeds a third predetermined threshold that is greater than the second predetermined threshold; and allowing the trainee full control of the autonomous vehicle when and only when the score exceeds a fourth predetermined threshold that is greater than the third predetermined threshold.

* * * * *